July 14, 1964  F. H. BEYEA  3,140,692

SALT BLOCK HOLDER

Filed Oct. 30, 1961

INVENTOR.
FRANK H. BEYEA
BY
John P. Murphy
ATTORNEY

United States Patent Office 3,140,692
Patented July 14, 1964

3,140,692
SALT BLOCK HOLDER
Frank Howe Beyea, Union Springs, N.Y.
Filed Oct. 30, 1961, Ser. No. 148,458
2 Claims. (Cl. 119—51)

The present invention relates to improvements in a holder for salt in block or cake form and more particularly to a holder designed to support the salt in a position so that the cows, horses and other livestock can readily feed therefrom, a maximum amount of salt being exposed to the animal. The invention also relates to a novel salt block which is adapted to fit the holder.

Several types of holder for salt compressed into cakes and blocks have been in use across the country and in other countries for some time. One of these holders is comprised of a wedge-like plug receivable in a cone-shaped opening in the central lower end of the salt cake, the plug being rotatably carried in a vertical position by a bracket which is secured to an available support such as a stanchion or stall member or a post. In using this type of holder, most of the outer surface of the salt cake is exposed so that the animal in feeding from the cake usually licks the vertical side thereof and in so doing consumes one side of the cake more rapidly than the other. A great deal of salt is wasted in this way as the unused side of the salt cake becomes loosened and falls from the plug holder when the consumption of the other side of the cake causes the load of salt to become unbalanced, thereby rendering the holder unuseable for the remainder of the salt block and wasting a great deal of salt.

Another type of holder for a salt block or cake is composed of a hollow cylindrical container which loosely receives a salt cake therein and which is provided with an opening or recess at the bottom end for exposing a portion of the lower edge of the salt cake. This holder must be mounted at an elevation so that the animal must lick the lower portion of the salt cake by reaching in an upward direction. Many animals, especially cows, will not stretch up for food in this manner and do not partake of the salt, therefore missing the necessary advantages of the consumption of salt.

Other types of salt block holders have included cylindrical flat pans in which the salt block is placed, some of these pans including a plug-type insert which protrudes into an opening in the lower portion of the block, thereby providing a means by which the block is held on the pan. These holders incur several disdvantages, including an uneven wearing of the salt block in its normal use, an insecurity of position in that a particularly rough animal with a strong tongue might dislodge the salt block from the holder, and a certain amount of waste in that the animal is unable to reach all portions of the salt block residing in the cylindrical holder.

Most feeding devices or holders, even those which are used to hold fine salt, are fastened to the stanchion or pipe by some form of a bracket which of necessity makes the holder extend out and away from the stanchion or pipe, and in a position which is hazardous to the animal and the device itself. Metal clamps, bolts, and nuts have been necessary in fastening the bracket which positions the holder against the stanchion or pipe, and it is possible for an animal to be cut or hurt by any exposed metal parts of the holder or bracket.

Earlier methods of providing salt for farm animals consisted merely of setting a large block of salt in the field or in the barn for community use by all the animals on the farm, the block being replaced when used. The disadvantages of this method are obvious in that the large block supplied salt for all the animals, thereby insuring the spread of any diseases which may be present in the herd. Also, a large community salt block was impractical inside the barn since most animals are individually secured in separate stalls and the use of the salt block would be possible only upon entering and leaving the barn, thereby causing large traffic jams of animals and wasting much of the farmer's valuable time.

It is therefore a main object of this invention to produce a holder for salt that has been compressed into blocks or cakes that will overcome the above-mentioned disadvantages and will maintain a block or cake of salt in the most desirable position with respect to accessibility and elevation for animals to easily feed therefrom and, simultaneously, to support the block or cake so that there will be no appreciable waste of the salt and so that a maximum amount of the salt will be exposed for a licking surface.

Another object of the invention is to provide a salt block holder which may be mounted vertically on a pipe or stanchion in a convenient location for the animal to feed therefrom equally well when the salt block is new and when most of the salt has been consumed.

Another object of the invention is to provide a holder for a salt block or cake which exposes a maximum amount of salt to the animal and which securely holds the salt block so that the animal cannot dislodge it from the holder.

Another object of the invention is to prevent the possibility of the animal being injured by any exposed metal parts of the holder or bracket supporting the holder, and to keep the holder and brick from extending out and in the way of the animal.

Other objects and advantages of the improved salt block and holder will become evident in a consideration of the following description taken in conjunction with the accompanying drawings, in which.

Figure 1:
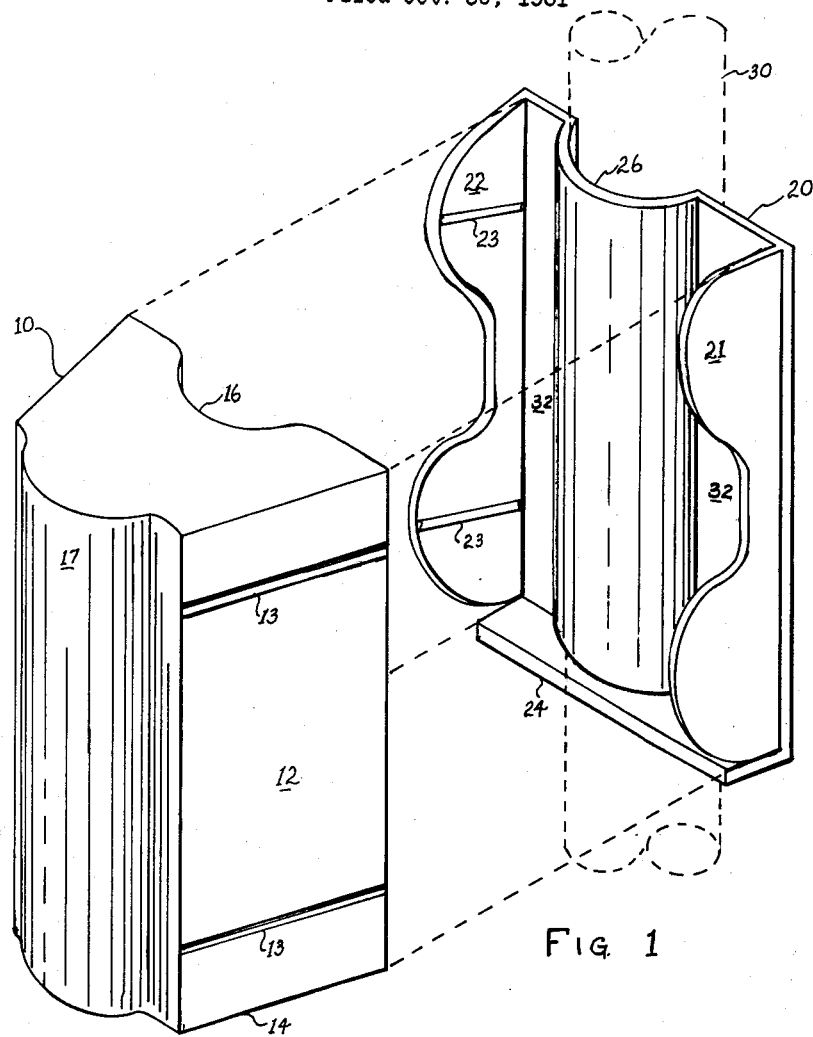
FIGURE 1 is an expanded isometric view of the salt block holder and the salt block embodying the various features of the invention. The holder is shown clamped to a post which is illustrated by broken lines.
Figure 2:
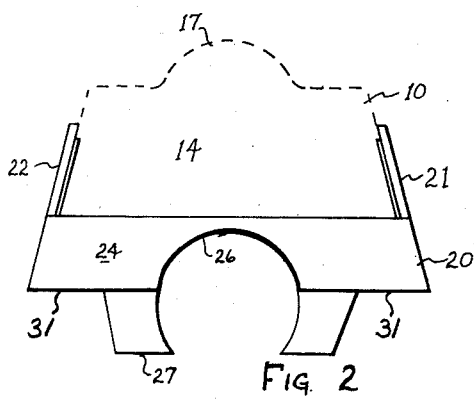
FIGURE 2 is a bottom plan view of the salt block positioned in the holder and ready to be used.

As illustrated in the acocmpanying drawings, the improved salt block holder 20 is comprised of a back portion with a semi-circular indention 26 extending vertically in the central portion thereof and adapted to fit against a cylindrical object such as a pipe, a bottom portion extending perpendicularly to said back portion, and side portions 21 and 22 mounted horizontally from the back portion and tapering toward the inside of the holder. The side portions 21 and 22 are constructed with protuberances 23 located on the inside edges, that is, those edges closer to the back portion 26. The rear portion 31 of the holder has strips 27 extending therefrom which are semi-circularly formed to fit around a pipe or stanchion. The salt block holder is positioned on the stanchion pipe 30 by frictional engagement of the strips 27 with the pipe 30. The body material, being a resilient plastic, allows the strips 27 to flex apart permitting the holder to be fitted over the stanchion tube 30 and then to firmly grip said tube to eliminate vertical motion of the holder. It should be understood that this means of securing the holder to the stanchion tube 30 is but one embodiment of this device. Applicant does not want to be limited to any particular stanchion fastening device, but would like to include all devices as may be suitable. It can be readily seen in FIGURE 1 of the drawings that the back portion of the holder is composed of two flat portions 32 flanking the aforementioned semi-circular portion 26, these parts being assembled in a vertical relation.

The salt block 10, which is shown in FIGURE 1 of the drawing, is designed to fit the holder as above described and comprises a top 15 and bottom 14 of substantially the same configuration, tapered sides 11 and 12 with indented grooves 13 therein, a back portion with a semi-circular indention therein and a front portion with a semi-circular extended portion. The semi-circular indention 16 of the back portion of the salt block will fit snugly against the vertical semi-circular portion of the back part of the holder previously described and the extended portion 17 of the salt block provides a larger amount of licking area for the animal.

It can be seen that the protuberances 23 on the inside edges of the sides 21 and 22 of the salt block holder will fit into the grooves 13 of the sides of the salt block and as the inwardly tapered sides of the holder retain the salt block against lateral movement, the protuberances fitted into the grooves hold the block against vertical movement and prevent the salt block from being dislodged from the holder as the animal licks the salt. The sides 21 and 22 of the holder are peculiarly shaped to expose a maximum amount of salt to the animal while providing sufficient support to prevent the salt block from being dislodged from the holder.

The bottom 24 of the holder is of sufficient size to support the salt block but still leave a great area of the salt exposed to the animal. The narrowness of the bottom portion enables the animal to partake of the salt down to the last remains, thereby limiting the amount of wasted salt.

It is intended that the holder 20 be molded of resilient plastic in one piece as shown in FIGURE 1 of the drawings. The plastic material provides several advantages, such as low cost construction and extreme durability as well as resistance to the corrosive qualities of salt. It is recognized that other materials can well produce the same desirable results.

It will be observed that the salt block will be consumed from the front portion thereof and that it will not be possible for the animal to wear away the securing means which hold the block in the holder before the entire cake of salt is consumed. In this way, waste of salt is substantially entirely eliminated and it will be possible for the animal to reach the salt in the holder down to the final remains.

The salt block herein described can readily be used in several salt block holders presently available, while the novel holder of the present invention must be provided with the salt block constructed as described. Other salt blocks presently on the market will not fit the subject salt block holder.

Although the construction and operation of this device are fairly simple, practical and efficient, I do not wish to be limited to the exact details as shown herein, it being evident that various changes may be made without departing from the spirit of the invention as set forth in the appended claims.

I claim:

1. A holder for salt blocks comprising supporting means for a salt block, backing means to vertically position said salt block, retaining means to hold said block against said supporting and backing means, and fastening means to position said holder against a desired object, said supporting means comprising a narrow ledgelike portion extending horizontally from said backing means at the bottom thereof, said backing means having a semicircular portion extending vertically through the central portion thereof, said portion shaped to fit against a cylindrical object, said retaining means consisting of tapered sides provided with cut outs to expose a maximum amount of salt, said sides having protuberances mounted on the inside portions thereof, said protuberances extending in a substantial horizontal direction to eliminate vertical movement of said salt block, said fastening means being integral with said body and backing means, said fastening means inside surface being of a semicircular configuration, and of such dimensions as to be rendered flexible; said supporting means, backing means, retaining means and fastening means comprised of a semirigid plastic material, said retaining means of sufficient thickness as to be rendered flexible.

2. A salt block holder as in claim 1, said supporting, backing, retaining and fastening means residing in a one-piece configuration.

References Cited in the file of this patent

UNITED STATES PATENTS

| 548,422 | Beardsley | Oct. 22, 1895 |
| 2,267,062 | Walter et al. | Dec. 23, 1941 |

FOREIGN PATENTS

| 747,689 | Great Britain | Apr. 11, 1956 |
| 821,366 | Great Britain | Oct. 7, 1959 |